United States Patent
Andersson et al.

(10) Patent No.: US 9,978,476 B2
(45) Date of Patent: *May 22, 2018

(54) POLYMER COMPOSITION FOR ELECTRICAL DEVICES

(75) Inventors: Johan Andersson, Hisings Backa (SE); Villgot Englund, Gothenburg (SE); Per-Ola Hagstrand, Stenungsund (SE); Ulf Nilsson, Stenungsund (SE); Annika Smedberg, Myggenas (SE); Thomas Steffl, Lauf (DE)

(73) Assignee: Borealis AG, Vienna (AT)

( * ) Notice: Subject to any disclaimer, the term of this patent is extended or adjusted under 35 U.S.C. 154(b) by 1177 days.

This patent is subject to a terminal disclaimer.

(21) Appl. No.: 14/115,112

(22) PCT Filed: May 3, 2012

(86) PCT No.: PCT/EP2012/058080
§ 371 (c)(1),
(2), (4) Date: Dec. 2, 2013

(87) PCT Pub. No.: WO2012/150287
PCT Pub. Date: Nov. 8, 2012

(65) Prior Publication Data
US 2014/0069689 A1 Mar. 13, 2014

(30) Foreign Application Priority Data
May 4, 2011 (EP) .................. 11164780

(51) Int. Cl.
*H01B 3/02* (2006.01)
*C08K 3/013* (2018.01)
(Continued)

(52) U.S. Cl.
CPC .............. *H01B 3/02* (2013.01); *C08K 3/013* (2018.01); *C08K 5/14* (2013.01); *C08L 23/06* (2013.01);
(Continued)

(58) Field of Classification Search
CPC combination set(s) only.
See application file for complete search history.

(56) References Cited

U.S. PATENT DOCUMENTS 4,626,618 A * 12/1986 Takaoka .................. C08K 3/04
174/102 SC
2002/0034689 A1 3/2002 Hoshida et al.
(Continued)

FOREIGN PATENT DOCUMENTS

CN 1175065 3/1998
CN 1711313 12/2005
(Continued)

OTHER PUBLICATIONS

"Nanocomposites based on polyolefins and functional thermoplastics" Ciardelli, Polymer International, vol. 57, Issue 6, Mar. 12, 2008.*
(Continued)

*Primary Examiner* — Jennifer A Steele
(74) *Attorney, Agent, or Firm* — Eversheds Sutherland (US) LLP (57) ABSTRACT

The present invention relates to a polymer composition with improved electrical properties and to a use thereof preferably in electrical devices as well as to a cable surrounded by at least one layer including the polymer composition.

16 Claims, 1 Drawing Sheet

(51) Int. Cl.
*H01B 13/06* (2006.01)
*C08K 5/14* (2006.01)
*C08L 23/06* (2006.01)
*C08K 3/26* (2006.01)
*C08K 3/00* (2018.01)

(52) U.S. Cl.
CPC ........... *H01B 13/06* (2013.01); *C08K 3/0033* (2013.01); *C08K 3/26* (2013.01)

(56) References Cited

U.S. PATENT DOCUMENTS

| | | |
|---|---|---|
| 2002/0042451 A1 | 4/2002 | Sugaya |
| 2004/0138351 A1 | 7/2004 | Kaprinidis et al. |
| 2004/0210002 A1 | 10/2004 | Haekoenen et al. |
| 2006/0055075 A1 | 3/2006 | Hoshida et al. |
| 2006/0142458 A1* | 6/2006 | Pang ............... B82Y 30/00 524/444 |
| 2006/0151758 A1 | 7/2006 | Reyes |
| 2007/0299173 A1 | 12/2007 | Wolfschwenger et al. |
| 2008/0254289 A1* | 10/2008 | Bostrom ............... C08K 5/01 428/375 |
| 2008/0315159 A1 | 12/2008 | Minagoshi |
| 2009/0238957 A1* | 9/2009 | Clancy ............... C08L 23/02 427/117 |
| 2010/0086268 A1 | 4/2010 | Reyes |
| 2011/0042624 A1 | 2/2011 | Minagoshi |
| 2011/0196078 A1 | 8/2011 | Wolfschwenger et al. |

FOREIGN PATENT DOCUMENTS

| | | | |
|---|---|---|---|
| EP | 0517868 B1 | 11/1995 | |
| EP | 0688794 B1 | 8/1998 | |
| EP | 1033724 | * 2/2000 | ............ H01B 7/295 |
| EP | 1168469 A2 | 1/2002 | |
| EP | 11211289 A1 | 6/2002 | |
| EP | 0810235 B1 | 11/2004 | |
| EP | 1484345 A1 | 12/2004 | |
| EP | 1669403 A1 | 6/2006 | |
| JP | 2018811 | 1/1990 | |
| JP | 4322009 | 11/1992 | |
| JP | 547215 | 2/1993 | |
| JP | H0547215 A | 2/1993 | |
| JP | 06052728 A | * 2/1994 | |
| JP | H07500621 A | 1/1995 | |
| JP | H0773748 A | 3/1995 | |
| JP | 19970129039 | 5/1997 | |
| JP | 2001266650 | * 9/2001 | ............ H01B 3/44 |
| WO | 2001/037289 A1 | 5/2001 | |
| WO | 2003/000754 A1 | 1/2003 | |
| WO | 2004/041919 A2 | 5/2004 | |

OTHER PUBLICATIONS

Japanese Search Report dated Aug. 20, 2016.

* cited by examiner

POLYMER COMPOSITION FOR ELECTRICAL DEVICES

FIELD OF INVENTION

The invention relates to a polymer composition for producing an electrical or communication device, preferably a layer of a cable, preferably of a power cable, more preferably of a direct current (DC) power cable, to a cable, preferably a power cable, more preferably a direct current (DC) power cable, which comprises the polymer composition and is optionally crosslinkable and subsequently crosslinked, as well as to a preparation process of the cable.

BACKGROUND ART

Polyolefins are widely used in demanding polymer applications wherein the polymers must meet high mechanical and/or electrical requirements. For instance in power cable applications, particularly in medium voltage (MV) and especially in high voltage (HV) and extra high voltage (EHV) cable applications the electrical properties of the polymer composition has a significant importance. Furthermore, the electrical properties of importance may differ in different cable applications, as is the case between alternating current (AC) and direct current (DC) cable applications.

Crosslinking of Cables

A typical power cable comprises a conductor surrounded, at least, by an inner semiconductive layer, an insulation layer and an outer semiconductive layer, in that order. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be effected using e.g. a free radical generating compound, such as a peroxide. Free radical generating agent is typically incorporated to the layer material prior to the extrusion of the layer(s) on a conductor. After formation of the layered cable, the cable is then subjected to a crosslinking step to initiate the radical formation and thereby crosslinking reaction. Peroxides are very common free radical generating compounds used i.a. in the polymer industry for said polymer modifications. The resulting decomposition products of peroxides may include volatile by-products which are undesired, since they can be hazardous and may have a negative influence on the electrical properties of the cable. Therefore the volatile decomposition products such as methane e.g. where dicumylperoxide is used, are conventionally reduced to a minimum or removed after crosslinking and cooling step. Such removal step is generally known as a degassing step. The degassing step is time and energy consuming and is thus a costly operation in a cable manufacturing process.

Also the used cable production line and desired production speed can bring limitations to the cable materials especially when producing power cables of a larger size. Moreover, i.a. the crosslinking rate and the crosslinking degree of the polymer in the cable layer should be sufficient in order to minimize or avoid any undesirable sagging problem occurring during the cable production, particularly when the cable is produced e.g. in a catenary continuous vulcanization (CCV) line (especially for thicker constructions), which is a well known vulcanisation line type in the field and described in the literature.

Electrical Conductivity

The DC electrical conductivity is an important material property e.g. for insulating materials for high voltage direct current (HV DC) cables. First of all, the strong temperature and electric field dependence of this property will influence the electric field. The second issue is the fact that heat will be generated inside the insulation by the electric leakage current flowing between the inner and outer semiconductive layers. This leakage current depends on the electric field and the electrical conductivity of the insulation. High conductivity of the insulating material can even lead to thermal runaway under high stress/high temperature conditions. The conductivity must therefore be sufficiently low to avoid thermal runaway.

Accordingly, in HV DC cables, the insulation is heated by the leakage current. For a specific cable design the heating is proportional to the insulation conductivity×(electrical field)$^2$. Thus, if the voltage is increased, far more heat will be generated.

There are high demands to increase the voltage of a power cable, preferably of direct current (DC) power cable, and thus a continuous need to find alternative polymer compositions with reduced conductivity. Such polymer compositions should preferably also have good mechanical properties required for demanding power cable embodiments.

DESCRIPTION OF THE INVENTION

The present invention provides polymer composition comprising (a) a polyolefin, (b) optionally peroxide which, if present, then is preferably present in an amount of less than 35 mmol —O—O—/kg polymer composition, and (c) an ion exchanger additive.

Unexpectedly, electrical DC conductivity of a polymer composition is markedly reduced, i.e. markedly lower, when the polyolefin (a) is combined together with the ion exchanger additive (c) and optionally crosslinked using the peroxide (b) (e.g. a well known dicumyl peroxide), as defined above or below.

Without binding to any theory it is believed that the ion exchanger additive (c) captures the ionic species which worsen (increase) the electrical DC conductivity, for instance the harmful anionic species, such as chlorine, which can be present in the polyolefin (a). Accordingly, the polymer composition is very desirable for electrical and communication applications, preferably for wire and cable applications, particularly for a power cable layers. Moreover, the polymer composition of the invention has electrical properties expressed i.a. as reduced, i.e. low, electrical DC conductivity, whereby the undesired heat formation, e.g. in the insulation layer of a power cable, and particularly of a DC power cable, can be minimised. Accordingly, the invention is particularly advantageous for cables.

The present invention further provides a use of a polymer composition comprising (a) a polyolefin, (b) optionally peroxide which, if present, then is preferably present in an amount of less than 35 mmol —O—O—/kg polymer composition, and (c) an ion exchanger additive, as defined above or below, for producing an electrical or communication device comprising said polymer composition, preferably for producing an insulation of an electrical or communication device. Such devices are e.g. cables, joints including termination joints in cable applications, capacitor films etc. The most preferred use of the invention is the use of said polymer composition for producing a layer of a cable.

The polymer composition of the invention is referred herein below also shortly as "polymer composition" or "Polymer composition". The components thereof as defined above are also shortly referred herein as "polyolefin (a)", "peroxide (b)" and, respectively, "ion exchanger additive (c)". The expression "in an amount of less than 35 mmol —O—O—/kg polymer composition" means that peroxide is present, i.e. a certain amount of peroxide is added to the polymer composition.

Preferably the polymer composition of the invention is crosslinkable. "Crosslinkable" means that the cable layer can be crosslinked before the use in the end application thereof. Crosslinkable polymer composition comprises the polyolefin (a), an ion exchanger additive (c) and the peroxide (b) in an amount as defined above, below or in claims. Moreover, the crosslinked polymer composition or, respectively, the crosslinked polyolefin (a), is crosslinked via radical reaction using the claimed amount of peroxide (b) present in the polymer composition before crosslinking. The crosslinked polymer composition has a typical network, i.a. interpolymer crosslinks (bridges), as well known in the field. As evident for a skilled person, the crosslinked polymer can be and is defined herein with features that are present in the polymer composition or polyolefin (a) before or after the crosslinking, as stated or evident from the context. For instance the presence and the amount of the peroxide in the polymer composition or the type and compositional property, such as MFR, density and/or unsaturation degree, of the polyolefin component (a) are defined, unless otherwise stated, before crosslinking, and the features after the crosslinking e.g. the electrical conductivity, is measured from the crosslinked polymer composition.

The present invention further provides a crosslinked polymer composition comprising a crosslinked polyolefin (a), wherein the polymer composition comprises prior to crosslinking (i.e. before it is crosslinked)

(a) a polyolefin, (b) peroxide preferably in an amount of the peroxide is of less than 35 mmol —O—O—/kg polymer composition, and (c) an ion exchanger additive.

It is most preferred that the polymer composition of the invention the polymer composition comprises peroxide (b). Accordingly, the present crosslinked polymer composition is preferred and is obtainable by crosslinking with an amount of peroxide (b) as defined above or below.

The present invention further provides a crosslinked polymer composition comprising a polyolefin (a) which is crosslinked with (b) peroxide in an amount of less than 35 mmol —O—O—/kg polymer composition in the presence of an ion exchanger additive (c).

The expressions "obtainable by crosslinking", "crosslinked with" and "crosslinked polymer composition" are used herein interchangeably and mean the category "product-by-process", i.e. that the product has a technical feature which is due to the crosslinking step as will be explained below.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt % of the well known dicumyl peroxide based on the total amount (100 wt %) of the polymer composition.

The "crosslinked polymer composition" is referred herein below also shortly as "Polymer composition" or "polymer composition". Also the "crosslinkable polymer composition" is referred herein below also shortly as "Polymer composition" or "polymer composition". The meaning is evident from the context.

The electrical conductivity is measured herein according to DC conductivity method as described under "Determination Methods". "Reduced" or "low" electrical conductivity as used herein interchangeably means that the value obtained from the DC conductivity method is low, i.e. reduced.

The preferred polyolefin (a) is a polyethylene produced in a high pressure process (HP). The polyolefin (a) is described in more details including the preferred subgroups thereof, below or in claims.

As to the ion exchanger additive (c) of the polymer composition:

The ion exchanger additive (c) of the polymer composition of the invention can be added to the polymer composition as such, i.e. neat, or as an additive composition as supplied by additive producers, which may contain e.g. a carrier material, e.g. a carrier polymer, and optionally further additives. Moreover, such ion exchanger additive (c) or the additive composition thereof can be added to the polymer composition as such, e.g. as supplied by the additive producer, or in a further carrier material, e.g. in a polymer carrier, for instance in a so called master batch (MB). The amount of the ion exchanger additive (c) as given below and claims is the weight (amount) of said ion exchanger additive (c) as such, i.e. neat, based on the total weight (amount) (100 wt %) of the polymer composition.

The ion exchanger additive (c) of the polymer composition of the invention is preferably an inorganic ion exchanger additive, more preferably an inorganic anion exchanger additive. Furthermore preferably the anion exchanger additive (c) can exchange anions by halogens (i.e. capture halogens), preferably at least chlorine based species. Further preferably the ion exchanger additive (c) has a lamellar structure.

Figure 1:
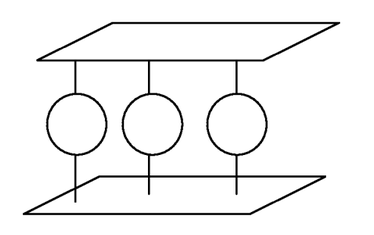
FIG. 1 is a schematic partial section of two lamellas and an interlayer in between to illustrate generally the lamellar structure of a preferable anion exchanger additive as the ion exchanger additive (b). The stable lamella layers are shown as continuous layers and the round shaped species illustrate the exchangeable anions of interlayers.

The preferred embodiment of the ion exchanger additive (c) is a lamellar anion exchanger, preferably a lamellar anion exchanger which comprises anionic interlayers. The preferable lamellar ion exchanger additive (c) comprises lamella layers which form the stable host lattice and the exchangeable anionic interlayers are between said lamellas. Anionic interlayers mean herein that the interlayers comprise anions which are weakly bonded to the lamella layers and exchangeable with the anionic species present in the polyolefin (a) of the polymer composition. FIG. 1 illustrates generally the lamellar structure (a schematic partial section showing two lamellas and an interlayer in between) of an anion exchanger additive as the preferable ion exchanger additive (c). In this preferred embodiment the interlayers of the lamellar anion exchanger (c) preferably comprise $CO_3^{2-}$ anions that are exchangeable with the anionic species present in the polymer composition, such as in polyolefin (a). Moreover, in this preferred embodiment the stable lamellas comprise preferably cation species selected e.g. from any of Mg-, Al-, Fe-, Cr-, Cu-, Ni- or Mn-cations, or any mixtures thereof, more preferably at least from $Mg^{2+}$-cations, and more preferably from $Mg^{2+}$ and $Al^{3+}$-cations, based species.

In this preferred embodiment the most preferred ion exchanger additive (c) is a lamellar anion exchanger additive of hydrotalcite type, preferably a lamellar anion exchanger additive of a synthetic hydrotalcite type comprising anionic interlayers which comprise exchangeable $CO_3^{2-}$ anions, even more preferably a lamellar anion exchanger additive of synthetic hydrotalcite type having a general formula $Mg_xR_y^{(3+)}(OH)_z(CO_3)_k*nH_2O$, wherein $R^{(3+)}$=Al, Cr or Fe, preferably Al. In said general formula, preferably, x is between 4-6; y is 2; z is between 6-18, k is 1 and n is between 3-4. It is evident that the ratios can vary, depending e.g. of the amount of the crystal water etc. As a non-limiting example only a general formula $Mg_6R_2^{(3+)}(OH)_{16}CO_3*4H_2O$, wherein $R^{(3+)}$=Al, Cr or Fe, preferably Al, can be mentioned.

Moreover in this preferred embodiment the ion exchanger additive (c), preferably the hydrotalcite as specified above, below or in claims, can be modified, for instance surface treated, as well known in the art.

The ion exchanger additives (c) suitable for the present invention are e.g. commercially available. Amongst the preferred ion exchanger additives (c), a commercially available synthetic hydrotalcite (IUPAC name: dialuminium hexamagnesium carbonate hexadecahydroxide, CAS no. 11097-59-9), can be mentioned, such as supplied by Kisuma Chemicals under the commercial name DHT-4V.

As mentioned above the optional and preferable peroxide (b) is present in the polymer composition and in an amount of at least 2.0 mmol —O—O—/kg polymer composition, preferably at least 3.0 mmol —O—O—/kg polymer composition, more preferably at least 4.0 mmol —O—O—/kg polymer composition. More preferably, the preferred crosslinked polymer composition of the invention, prior to crosslinking, comprises said peroxide (b) in amount of 34 mmol —O—O—/kg polymer composition or less, preferably of 33 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, even more preferably from 15 to 30 mmol —O—O—/kg polymer composition. The peroxide (b) content depends on the desired crosslinking level and in one embodiment the peroxide (b) content prior crosslinking is desired to be even preferably 17 to 29 mmol —O—O—/kg polymer composition. Furthermore, the polyolefin (a) may be unsaturated, whereby the peroxide (b) content may depend on the unsaturation degree.

More preferably, the crosslinked polymer composition of the invention has after the crosslinking an electrical conductivity of <0.01 (lower values not detectable by the DC conductivity measurement) to 100 fS/m, more preferably of <0.01 to 90 fS/m, more preferably from <0.01 to 80 fS/m, more preferably of <0.01 to 70 fS/m, more preferably of <0.01 to 60 fS/m, more preferably of <0.01 to 50 fS/m, more preferably of <0.01 to 30 fS/m, more preferably of <0.01 to 20 fS/m, more preferably of 0.01 to 15 fS/m, most preferably of 0.05 to 10 fS/m, even most preferably of 1.0 to 10 fS/m when measured according to DC conductivity method as described under "Determination Methods".

Moreover, the electrical conductivity of the Polymer composition is surprisingly low even without removing the volatile by-products after crosslinking, i.e. without degassing, compared to electrical conductivity of a non-degassed polymer composition crosslinked with conventional amounts of peroxide. Therefore, if desired, the degassing step of the crosslinked cable containing the Polymer composition can be considerably shortened and/or effected in less demanding conditions during cable production process which naturally improves the production efficiency. Accordingly, if desired the degassing step during the cable production can be shortened.

Further unexpectedly, the peroxide (b) content can be reduced without sacrificing mechanical properties of the obtained crosslinked polymer composition which are important for power cable layers. Thus unexpectedly, in addition to reduced electrical conductivity of the Polymer composition, also one or more, more preferably all, of the mechanical properties selected from PENT (Pennsylvania Notch Test) and one or both of Tensile properties expressed as Stress at Break and Strain at Break, remain in feasible or at least similar level as the mechanical properties of the prior art crosslinked polymer compositions used in the cable layers. The reason for the advantageous balance between improved electrical conductivity and good mechanical properties is not fully understood. Without binding to any theory one of the reasons may be that an unexpectedly high degree of crystallinity (%) of the crosslinked polymer is maintained compared to the degree of crystallinity obtained with conventional concentrations of peroxide. Accordingly and further preferably the polymer composition of the invention has an unexpected balance between electrical and mechanical properties, which is very advantageous e.g. for DC power cables and, surprisingly, also for HV or EHV DC power cables.

Accordingly, the preferred crosslinked polymer composition of the invention has further preferably a PENT life time of 200 hours or more, preferably of 400 hours or more, when measured according to PENT test under load at 2 MPa and at ageing temperature of 70° C. as described under "Determination methods". PENT indicates the resistance to slow crack propagation and the higher the value the better is said resistance.

Further preferably, the preferred crosslinked polymer composition of the invention has advantageous tensile properties which are expressed herein as Stress at Break or Strain at Break each of which are defined at two temperatures, i.e. when measured according to Tensile test method according to ISO 527-2:1993 using sample geometry 5 A.

Accordingly, the crosslinked polymer composition of the invention is used for determining the above electrical and the preferable mechanical properties thereof. The respective sample preparation of the crosslinked polymer composition is described below under the "Determination methods".

Moreover, the electrical DC conductivity is very low, although the content of the preferable peroxide (b) is very low as defined above, below or in claims and still, surprisingly, very good mechanical properties needed for wire and cable applications can be maintained.

The low electrical conductivity of the Polymer composition is very advantageous i.a. for power cables, and due to low electrical DC conductivity, preferred for direct current (DC) power cables, preferably low voltage (LV), medium voltage (MV), high voltage (HV) or extra high voltage (EHV) DC cables, more preferred for DC power cables operating at any voltages, preferably at higher than 36 kV, such as HV DC cables.

The invention further provides a cable, preferably a power cable, more preferably a power cable, even more preferably a direct current (DC) power cable, comprising a conductor surrounded by one or more layers, wherein at least one of said layer(s) comprises, preferably consists of, a polymer composition
(a) a polyolefin,
(b) optionally and preferably peroxide, which is preferably present and more preferably in an amount of less than 35 mmol —O—O—/kg polymer composition, and
(c) an ion exchanger additive; as defined above, below or in claims. It is preferred that the at least one layer of said cable is an insulation layer.

More preferably, the invention is directed to a power cable, preferably to a direct current (DC) power cable, more preferably to a HV or EHV DC power cable, comprising a conductor surrounded by at least an inner semiconductive layer, an insulation layer and an outer semiconductive layer, in that order, wherein at least one layer, preferably the insulation layer, comprises, preferably consists of, a polymer composition of the invention comprising
(a) a polyolefin,
(b) optionally and preferably peroxide, which is preferably present and more preferably in an amount of less than 35 mmol —O—O—/kg polymer composition, and
(c) an ion exchanger additive; as defined above, below or in claims.

It is preferred that said cable of the invention is crosslinkable. The invention is further directed to a crosslinked power cable, preferably to a crosslinked direct current (DC) power cable, comprising a conductor surrounded by one or more layers, wherein at least one of said layer(s) comprises, preferably consists of, a crosslinked polymer composition comprising a polyolefin (a) and an ion exchanger additive (c), which is crosslinked (i.e. obtained by crosslinking) with peroxide (b) in an amount of less than 35 mmol —O—O—/kg polymer composition; as defined above, below or in claims. More preferably, the invention is directed to a crosslinked power cable, preferably to a crosslinked direct current (DC) power cable, more preferably to a crosslinked HV or EHV DC power cable, comprising a conductor surrounded by at least an inner semiconductive layer, an insulation layer and an outer semiconductive layer, in that order, wherein at least one layer, preferably the insulation layer, comprises, preferably consists of, a crosslinked polymer composition comprising prior crosslinking
(a) a polyolefin,
(b) peroxide in an amount of less than 35 mmol —O—O—/kg polymer composition and
(c) an ion exchanger additive; and wherein the polyolefin (a) is crosslinked in the presence of said (b) peroxide.

The invention is further directed to a method for reducing, i.e. for providing low, electrical conductivity of an optionally and preferably crosslinked polymer composition comprising a polyolefin optionally and preferably crosslinked with peroxide, wherein the method comprises a step of producing a polymer composition by mixing together
(a) a polyolefin,
(b) optionally, and preferably, peroxide which, if present, is preferably present in an amount of less than 35 mmol —O—O—/kg polymer composition, preferably of 34 mmol —O—O—/kg polymer composition or less, preferably of 33 mmol —O—O—/kg polymer composition or less, preferably of 30 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition and
(c) an ion exchanger additive; as defined in the preceding claims, and
optionally and preferably crosslinking the polyolefin (a) in the presence of said peroxide (b).

More preferably the invention is directed to a method for reducing the electrical conductivity of an optionally and preferably crosslinked polymer composition of an optionally and preferably crosslinked power cable, preferably of an optionally and preferably crosslinked direct current (DC) power cable, more preferably of an optionally and preferably crosslinked HV or EHV DC power cable, comprising a conductor which is surrounded by at least an insulation layer, preferably at least by an inner semiconductive layer, an insulation layer and an outer semiconductive layer, in that order, wherein at least the insulation layer comprises a polymer composition comprising
(a) a polyolefin,
(b) optionally and preferably peroxide, which is preferably present and more preferably in an amount of less than 35 mmol —O—O—/kg polymer composition, and
(c) an ion exchanger additive; as defined above, below or in claims, and
optionally and preferably crosslinking the polyolefin (a) in the presence of said peroxide (b).

The invention is directed also to a process for producing a cable, preferably a power cable, more preferably a crosslinkable and crosslinked power cable, preferably a crosslinkable and crosslinked direct current (DC) power cable, as defined above or below.

The invention further provides a subgroup of the polymer composition comprising
(a) a polyolefin which is a polyethylene produced in a high pressure process,
(b) optionally peroxide which, if present, is preferably present in an amount of less than 35 mmol —O—O—/kg polymer composition, and
(c) an ion exchanger additive; as defined above, below or in claims.

The further preferable subgroups of the above properties, further properties, variants and embodiments as defined above or below for the Polymer composition, including the non-crosslinked and crosslinked polymer composition, or for the components thereof apply equally and independently to the method for reducing electrical conductivity, to the power cable, preferably to the crosslinkable and crosslinked DC power cable, as well as to process for producing a power cable, preferably a crosslinkable and crosslinked DC power cable, of the invention.

(a) Polyolefin Component

The following preferable embodiments, properties and subgroups of (a) the polyolefin component suitable for the Polymer composition are generalisable so that they can be used in any order or combination to further define the preferable embodiments of the Polymer composition. Moreover, it is evident that the given description applies to the polyolefin (a) before it is optionally and preferably crosslinked.

The term polyolefin (a) means both an olefin homopolymer and a copolymer of an olefin with one or more comonomer(s). As well known "comonomer" refers to copolymerisable comonomer units.

The polyolefin (a) can be any polyolefin, such as any conventional polyolefin, which is suitable as a polymer in a layer, preferably an insulating layer, of an electrical cable, preferably of a power cable.

The polyolefin can be e.g. a commercially available polymer or can be prepared according to or analogously to known polymerization process described in the chemical literature.

More preferably the polyolefin (a) is a polyethylene produced in a high pressure process (HP), more preferably a low density polyethylene LDPE produced in a high pressure process. The meaning of LDPE polymer is well known and documented in the literature. Although the term LDPE is an abbreviation for low density polyethylene, the term is understood not to limit the density range, but covers the LDPE-like HP polyethylenes with low, medium and higher densities. The term LDPE describes and distinguishes only the nature of HP polyethylene with typical features, such as different branching architecture, compared to the PE produced in the presence of an olefin polymerisation catalyst.

The LDPE as said polyolefin (a) may be a low density homopolymer of ethylene (referred herein as LDPE homopolymer) or a low density copolymer of ethylene with one or more comonomer(s) (referred herein as LDPE copolymer). The one or more comonomers of LDPE copolymer are preferably selected from the polar comonomer(s), non-polar comonomer(s) or from a mixture of the polar comonomer(s) and non-polar comonomer(s), as defined above or below. Moreover, said LDPE homopolymer or LDPE copolymer as said polyolefin (a) may optionally be unsaturated.

As a polar comonomer for the LDPE copolymer as said polyolefin (a), comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of LDPE copolymer is selected from the groups of acrylate(s), methacrylate(s) or acetate(s), or any mixtures thereof. If present in said LDPE copolymer, the polar comonomer(s) is preferably selected from the group of alkyl acrylates, alkyl methacrylates or vinyl acetate, or a mixture thereof. Further preferably, said polar comonomers are selected from $C_1$- to $C_6$-alkyl acrylates, $C_1$- to $C_6$-alkyl methacrylates or vinyl acetate. Still more preferably, said polar LDPE copolymer is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer, if said polyolefin (a), comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the polyolefin (a) is the LDPE polymer which is a copolymer, it preferably comprises 0.001 to 50 wt.-%, more preferably 0.05 to 40 wt.-%, still more preferably less than 35 wt.-%, still more preferably less than 30 wt.-%, more preferably less than 25 wt.-%, of one or more comonomer(s).

The Polymer composition, preferably the polyolefin (a) component thereof, more preferably the LDPE polymer, may optionally be unsaturated, i.e. the polymer composition, preferably the polyolefin (a), preferably the LDPE polymer, may comprise carbon-carbon double bonds. The "unsaturated" means herein that the polymer composition, preferably the polyolefin, contains carbon-carbon double bonds/1000 carbon atoms in a total amount of at least 0.4/1000 carbon atoms.

As well known, the unsaturation can be provided to the Polymer composition i.a. by means of the polyolefin (a), a low molecular weight (Mw) compound(s), such as cross-linking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the Polymer composition means the sum of the double bonds present in the double-bond sources. It is evident that a characteristic model compound for calibration is used for each chosen source to enable the quantitative infrared (FTIR) determination.

Any double bond measurements are carried out prior to crosslinking.

If the polymer composition is unsaturated prior to cross-linking, then it is preferred that the unsaturation originates at least from an unsaturated polyolefin (a) component. More preferably, the unsaturated polyolefin (a) is an unsaturated polyethylene (a), more preferably an unsaturated LDPE polymer, even more preferably an unsaturated LDPE homopolymer or an unsaturated LDPE copolymer. When polyunsaturated comonomer(s) are present in the LDPE polymer as said unsaturated polyolefin (a), then the LDPE polymer is an unsaturated LDPE copolymer.

In a preferred embodiment the term "total amount of carbon-carbon double bonds" is defined from the unsaturated polyolefin (a), and refers, if not otherwise specified, to the combined amount of double bonds which originate from vinyl groups, vinylidene groups and trans-vinylene groups, if present. Naturally the polyolefin (a) does not necessarily contain all the above three types of double bonds. However, any of the three types, when present, is calculated to the "total amount of carbon-carbon double bonds". The amount of each type of double bond is measured as indicated under "Determination methods".

If an LDPE homopolymer as said polyolefin (a) is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable for the unsaturated polyolefin (a) preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from $C_8$ to $C_{14}$ non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the C—C double bonds, preferably to the total amount of the vinyl groups. Herein, when a compound which can also act as comonomer, such as propylene, is used as CTA for providing double bonds, then said copolymerisable comonomer is not calculated to the comonomer content.

If the polyolefin (a), more preferably the LDPE polymer, is unsaturated, then it has preferably a total amount of carbon-carbon double bonds, which originate from vinyl groups, vinylidene groups and trans-vinylene groups, if present, of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is preferably higher than 0.50/1000 carbon atoms, preferably higher than 0.60/1000 carbon atoms. Such higher amount of double bonds is preferable e.g. if high cable production speed is desired and/or it would be desirable to minimise or to avoid sagging problems which may occur e.g. depending on the desired end application and/or the cable production process. Higher double bond content combined with "low" peroxide content of the invention is also preferred in cable embodiments, such as in DC power cables, where very demanding mechanical and/or heat resistance properties are needed for the layer, preferably insulation layer, material.

More preferably the polyolefin (a) is unsaturated and contains at least vinyl groups and the total amount of vinyl groups is preferably higher than 0.05/1000 carbon atoms, still more preferably higher than 0.08/1000 carbon atoms, most preferably of higher than 0.11/1000 carbon atoms, and even more preferably vinyl groups/1000 carbon atoms in an amount of 0.15/1000 carbon atoms or more. Preferably, the total amount of vinyl groups is up to 4.0/1000 carbon atoms. More preferably, the polyolefin (a), prior to crosslinking, contains vinyl groups in total amount of more than 0.20/1000 carbon atoms, still more preferably of more than 0.30/1000 carbon atoms, and most preferably of more than 0.40/1000 carbon atoms. In some demanding embodiments, preferably in power cables, more preferably in DC power cables, at least one layer, preferably the insulation layer, comprises LDPE polymer, preferably LDPE copolymer, which contains vinyl groups in total amount of more than 0.50/1000 carbon atoms.

Unexpectedly the unsaturation further contributes to said desirable balance of low conducitivty and mechanical properties. The preferred polyolefin (a) for use in the polymer composition is an unsaturated LDPE copolymer of ethylene with at least one polyunsaturated comonomer, preferably a diene as defined above, and optionally with other comonomer(s). Further preferably such unsaturated LDPE copolymer of ethylene with at least one polyunsaturated comonomer, preferably a diene as defined above, and optionally with other comonomer(s), contains vinyl groups. In this embodiment the total amount of vinyl groups is preferably as defined above, below or in claims. Said unsaturated LDPE copolymer is highly usable for the method for further reducing the electrical conductivity of a crosslinked polymer composition, preferable of an insulation layer of a power cable, preferably of a DC power cable.

Typically, and preferably in wire and cable (W&C) applications, the density of the polyolefin (a), preferably of the LDPE polymer, is higher than 860 kg/m³. Preferably the density of the polyolefin (a), preferably of the LDPE polymer, the ethylene homo- or copolymer is not higher than 960 kg/m³, and preferably is from 900 to 945 kg/m³. The $MFR_2$ (2.16 kg, 190° C.) of the polyolefin (a), preferably of the LDPE polymer, is preferably from 0.01 to 50 g/10 min, more preferably is from 0.1 to 20 g/10 min, and most preferably is from 0.2 to 10 g/10 min.

Accordingly, the polyolefin (a) of the invention is preferably produced at high pressure by free radical initiated polymerisation (referred to as high pressure (HP) radical polymerization). The HP reactor can be e.g. a well known tubular or autoclave reactor or a mixture thereof, preferably a tubular reactor. The preferred polyolefin (a) is optionally, and preferably, unsaturated LDPE homopolymer or LDPE copolymer of ethylene with one or more comonomer(s), as defined above. The LDPE polymer obtainable by the process of the invention preferably provides the advantageous electrical properties as defined above or below. The high pressure (HP) polymerisation and the adjustment of process conditions for further tailoring the other properties of the polyolefin (a) depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

After the separation the obtained polymer is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner to result in the Polymer composition.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the C—C double bond content can be adjusted by polymerising the ethylene e.g. in the presence of one or more polyunsaturated comonomer(s), chain transfer agent(s), process conditions, or any combinations thereof, e.g. using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerisation of ethylene with polyunsaturated monomers. As a result the unsaturation can be uniformly distributed along the polymer chain in random copolymerisation manner. Also e.g. WO 9635732 describes high pressure radical polymerisation of ethylene and a certain type of polyunsaturated α,ω-divinylsiloxanes.

Polymer Composition

The Polymer composition of the invention comprises typically at least 50 wt %, preferably at least 60 wt %, more preferably at least 70 wt %, more preferably at least 75 wt %, more preferably from 80 to 100 wt % and more preferably from 85 to 100 wt %, of the polyolefin (a) based on the total weight of the polymer component(s) present in the Polymer composition. The preferred Polymer composition consists of the polyolefin (a) as the only polymer component. The expression means that the Polymer composition does not contain further polymer components, but the polyolefin (a) as the sole polymer component. However, it is to be understood herein that the Polymer composition may comprise further components other than polyolefin (a), the optional and preferable peroxide (b) and the ion exchanger additive (c), such as further additives which may, as the ion exchanger additive (c), optionally be added in a mixture with a carrier polymer, i.e. in so called master batch.

The amount of the ion exchanger additive (c), preferably the hydrotalcite as defined above, below or in claims, naturally depends on the desired end application (e.g. the desired conductivity level) and can be adapted by a skilled person. Preferably, the polymer composition comprises the ion exchanger additive (c), preferably the hydrotalcite, as defined above, below or in claims, as such, i.e. neat, in an amount of less than 1 wt %, preferably of less than 0.8 wt %, preferably from 0.000001 to 0.7 wt %, preferably from 0.000005 to 0.6 wt %, more preferably from 0.000005 to 0.5 wt %, more preferably from 0.00001 to 0.1 wt %, more preferably from 0.00001 to 0.08 w %, more preferably from 0.00005 to 0.07 w %, more preferably from 0.0001 to 0.065 w %, more preferably from 0.0001 to 0.06 w %, more preferably from 0.0001 to 0.05 w %, more preferably from 0.0001 to 0.045 wt %, more preferably from 0.00015 to 0.035 wt %, more preferably from 0.0002 to 0.025 wt %, more preferably from 0.0003 to 0.015 wt %, more preferably from 0.0005 to 0.01 wt %, more preferably from 0.0008 to 0.005 wt %, more preferably from 0.001 to 0.004 wt %, more preferably from 0.0015 to 0.0035 wt %, based on the total weight of the polymer composition.

The amount of the optional and preferable peroxide (b) is as defined above or in claims. Prior to the optional and preferable crosslinking the polymer composition of the invention comprises at least one peroxide (b) which contains at least one —O—O— bond. Naturally, in case where two or more different peroxide products are used in the polymer composition, then amount (in mmol) of —O—O—/kg polymer composition as defined above, below or in claims is the sum of the amount of —O—O—/kg polymer composition of each peroxide product. As non-limiting examples of suitable organic peroxides (b), di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl) peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned. Preferably, the peroxideis selected from 2,5-di(tert-butylperoxy)-2,5-dimethylhexane, di(tert-butylperoxyisopropyl)benzene, dicumylperoxide, tert-butylcumylperoxide, di(tert-butyl) peroxide, or mixtures thereof. Most preferably, the peroxide (b) is dicumylperoxide.

Additionally, prior to the optional and preferable crosslinking the polymer composition of the invention may contain, in addition to the polyolefin (a), the optional and preferable peroxide (b) and the ion exchanger additive (c), further component(s) such as polymer component(s) and/or additive(s), preferably additive(s), such as antioxidant(s), scorch retarder(s) (SR), crosslinking booster(s), stabiliser(s), processing aid(s), flame retardant additive(s), water tree retardant additive(s), further acid or ion scavenger(s), inorganic filler(s) and voltage stabilizer(s), as known in the polymer field. The Polymer composition comprises preferably conventionally used additive(s) for W&C applications, such as one or more antioxidant(s) and optionally one or more scorch retarder(s), preferably at least one or more antioxidant(s). The used amounts of additives are conventional and well known to a skilled person, e.g. as already described above under "Description of the invention".

The Polymer composition preferably consist of the polyolefin (a), preferably polyethylene, more preferably LDPE homo or copolymer, which may optionally, and preferably, be unsaturated before crosslinking, as the sole polymer component.

End Uses and End Applications of the Invention

The new Polymer composition of the invention is highly useful in wide variety of end applications of polymers. The preferred use of the Polymer composition is in W&C applications, more preferably in one or more layers of a power cable, including the preferable subgroups thereof which can be combined in any order with the preferable subgroups and properties of the polymer composition and the components thereof; as defined above, below or in claims.

A power cable is defined to be a cable transferring energy operating at any voltage. The polymer composition of the invention is very suitable for power cables operating at voltages higher than 36 kV, such cables cover high voltage (HV) and extra high voltage (EHV) power cables which EHV cables operate even at much higher voltages, as well known in the field. The above terms have well known meanings and thus indicate the operating level of such cables. For HV and EHV DC power cables the operating voltage is defined herein as the electric voltage between ground and the conductor of the high voltage cable. Typically a HV DC power cable and EHV DC power cable operate at voltages of 40 kV or higher, even at voltages of 50 kV or higher. A power cable operating at very high voltages is known in the art as EHV DC power cable which in practice can be as high as, but not limited to, 900 kV.

The Polymer composition is highly suitable for use as a layer material for a power cable, preferably for a direct current (DC) power cable, more preferably for a DC power cable operating at voltages at higher than 36 kV, such as well known HV or EHV DC power cable, as defined above.

A cable, preferably a power cable, more preferably a crosslinkable power cable, preferably a crosslinkable DC power cable, is provided comprising a conductor surrounded by one or more layers, preferably at least an insulation layer, more preferably at least an inner semiconductive layer, an insulation layer and an outer semiconductive layer, in that order, wherein at least one of said layer(s), preferably the insulation layer, comprises, preferably consists of, a polymer composition comprising (a) polyolefin which is preferably a polyethylene produced in a high pressure process, more preferably an unsaturated LDPE copolymer, (b) optionally and preferably peroxide, which is preferably present and more preferably in an amount of less than 35 mmol —O—O—/kg polymer composition, preferably of 34 mmol —O—O—/kg polymer composition or less, preferably of 33 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, even more preferably from 15 to 30 mmol —O—O—/kg polymer composition, and (c) an ion exchanger additive (c); as defined above, below or in claims.

Depending on the desired crosslinking level and unsaturation degree of the polymer composition, preferably of the polyolefin (a), the peroxide (b) content of the polymer composition in some cases may be even more preferably from 17 to 29 mmol —O—O—/kg polymer composition.

The term "conductor" means herein above and below that the conductor comprises one or more wires. Moreover, the cable may comprise one or more such conductors. Preferably the conductor is an electrical conductor and comprises one or more metal wires.

As well known the cable can optionally comprise further layers, e.g. layers surrounding the insulation layer or, if present, the outer semiconductive layers, such as screen(s), a jacketing layer, other protective layer(s) or any combinations thereof.

The invention also provides process for producing a cable, wherein the process comprises the steps of (a) providing and mixing, preferably meltmixing in an extruder, a polymer composition, (b) applying at least a meltmix of the polymer composition obtained from step (a), preferably by (co)extrusion, on a conductor to form one or more layers, preferably at least an insulation layer, and (c) optionally and preferably crosslinking at least the polymer composition in said at least one layer, preferably in the insulation layer, wherein said at least one layer, preferably the insulation layer comprises, preferably consists of, polymer composition comprising (a) a polyolefin, (b) optionally and preferably peroxide, and further preferably the amount of the peroxide is of less than 35 mmol —O—O—/kg polymer composition, preferably of 34 mmol —O—O—/kg polymer composition or less, preferably of 33 mmol —O—O—/kg polymer composition or less, preferably of 30 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, and (c) an ion exchanger additive; as defined above or in claims.

The preferred process is for producing a power cable, preferably a DC power cable, more preferably a HV DC power cable, comprising a conductor surrounded by an inner semiconductive layer, an insulation layer, and an outer semiconductive layer, in that order, wherein the process comprises the steps of (a)
providing and mixing, preferably meltmixing in an extruder, a first semiconductive composition comprising a polymer, a carbon black and optionally further component(s) for an inner semiconductive layer, providing and mixing, preferably meltmixing in an extruder, an insulation composition for an insulation layer, providing and mixing, preferably meltmixing in an extruder, a second semiconductive composition comprising a polymer, a carbon black and optionally further component(s) for an outer semiconductive layer, (b) applying on a conductor, preferably by coextrusion,
a meltmix of the first semiconductive composition obtained from step (a) to form the inner semiconductive layer,
a meltmix of the insulation composition obtained from step (a) to form the insulation layer, and
a meltmix of the second semiconductive composition obtained from step (a) to form the outer semiconductive layer, and (c) optionally and preferably crosslinking at crosslinking conditions one or more of the insulation composition of the insulation layer, the first semiconductive composition of the inner semiconductive layer and the second semiconductive composition of the outer semiconductive layer, of the obtained cable, preferably at least the insulation composition of the insulation layer, more preferably the insulation composition of the insulation layer, the first semiconductive composition of the inner semiconductive layer and the second semiconductive composition of the outer semiconductive layer, and wherein at least the insulation composition comprises, preferably consists of, a polymer composition comprising (a) a polyolefin, (b) optionally and preferably peroxide, and further preferably the amount of the peroxide is of less than 35 mmol —O—O—/kg polymer composition, preferably of 34 mmol —O—O—/kg polymer composition or less, preferably of 33 mmol —O—O—/kg polymer composition or less, preferably of 30 mmol —O—O—/kg polymer composition or less, more preferably from 5.0 to 30 mmol —O—O—/kg polymer composition, more preferably from 7.0 to 30 mmol —O—O—/kg polymer composition, more preferably from 10.0 to 30 mmol —O—O—/kg polymer composition, and (c) an ion exchanger additive; as defined above, below or in claims.

The polymer of the first and the second semiconductive composition is preferably a polyolefin produced in the presence of an olefin polymerisation catalyst, also known as a low pressure polyolefin, which is preferably a low pressure polyethylene, or a polyolefin (a) as described in relation to the polymer composition of the invention. The carbon black can be any conventional carbon black used in the semiconductive layers of a DC power cable, preferably in the semiconductive layer of a DC power cable. Preferably the carbon black has one or more of the following properties: a) a primary particle size of at least 5 nm which is defined as the number average particle diameter according ASTM D3849-95a, dispersion procedure D b) iodine number of at least 30 mg/g according to ASTM D1510, c) oil absorption number of at least 30 ml/100 g which is measured according to ASTM D2414. Non-limiting examples of carbon blacks are e.g. acetylene carbon black, furnace carbon black and Ketjen carbon black, preferably furnace carbon black and acetylene carbon black. Preferably, the first and the second semiconductive polymer composition comprises 10 to 50 wt % carbon black, based on the weight of the Semiconductive composition.

Melt mixing means mixing above the melting point of at least the major polymer component(s) of the obtained mixture and is typically carried out in a temperature of at least 10-15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads.

As well known, the polymer composition of the invention and the optional and preferred first and second semiconductive compositions can be produced before or during the cable production process. Moreover the polymer composition of the invention and the optional and preferred first and second semiconductive composition can each independently comprise part or all of the component(s) thereof before introducing to the (melt)mixing step a) of the cable production process.

Preferably, the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to a solid polymer particles. A well-known post-reactor modification is pelletising a meltmix of a polymer product and optional additive(s) in a pelletising equipment to solid pellets. Pellets can be of any size and shape.

The mixing step (a) of the provided polymer composition of the invention and of the preferable first and second semiconductive compositions is preferably carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s). In case at least one of the optional and preferable peroxide(s) (b) or the ion exchanger additive (c), or part or all of the optional further component(s), such as further additive(s), of the polymer composition of the invention and of the optional and preferred first and second semiconductive compositions, are added to the polyolefin during the cable production process, then the addition(s) can take place at any stage during the mixing step (a), e.g at the optional separate mixer preceding the cable extruder or at any point(s) of the cable extruder. The addition of peroxide and optional additive(s) can be made simultaneously or separately as such, preferably in liquid form, or in a well known master batch, and at any stage during the mixing step (a).

In a second embodiment, premade pellets of the polymer composition comprising the polyolefin (a) combined with the optional and preferable peroxide (b) and the ion exchanger additive (c) are provided to the step (a) of the process. In such embodiment at least the ion exchanger additive (c) as such (neat) or in a master batch (MB) and optionally the optional and preferable peroxide (b) are added to the polyolefin (a) and the mixture is meltmixed and the obtained meltmix pelletised to the solid pellets which are then provided to the step (a) of the cable production process. In this embodiment, however, the optional and preferable peroxide (b) is preferably impregnated to the formed pellets comprising the polyolefin (a) and the ion exchanger additive (c). The addition of the optional additive(s) to the polyolefin (a) can be carried out as described above for the ion exchanger additive (c) or for the optional and preferable peroxide (b).

The polymer composition is most preferably provided according to the above second embodiment to the cable production process.

In a preferred embodiment of the cable production process, a crosslinkable power cable, preferably a crosslinkable DC power cable, more preferably a crosslinkable HV DC power cable, is produced, wherein the insulation layer comprises the polymer composition of the invention comprising a crosslinkable polyolefin (a), optionally, and preferably, an unsaturated LDPE homo or copolymer, a peroxide (b) in an amount as given above or below, and the ion exchanger additive (c), and then the crosslinkable polyolefin (a) in the insulation layer of the obtained cable is crosslinked in step c) in crosslinking conditions. More preferably in this embodiment, a crosslinked power cable, preferably a crosslinked DC power cable, more preferably a crosslinked HV DC power cable, is produced, which comprises a conductor surrounded by an inner semiconductive layer comprising, preferably consisting of, a first semiconductive composition, an insulation layer comprising, preferably consisting of, a polymer composition of the invention as defined above, below or in claims, and optionally, and preferably, an outer semiconductive layer comprising, preferably consisting of, a second semiconductive composition, wherein at least the polymer composition of the insulation layer, optionally and preferably at least one, preferably both, of the first and the second semiconductive composition the inner and, respectively, outer semiconductive layer, is crosslinked at crosslinking conditions in step (c). Crosslinking of the polymer composition of the insulation layer is carried out in the presence of a peroxide (b) in an amount as defined above or in below claims, and the optional and preferable crosslinking of the first semiconductive composition of the inner semiconductive, is carried out in the presence of crosslinking agent(s), preferably in the presence of free radical generating agent(s), which is preferably a peroxide(s).

The crosslinking of the polymer composition of the insulation layer of the invention is thus most preferably carried out in the presence of the inventive "low amount" of the peroxide (b) as defined above, below or in claims.

The crosslinking agent(s) can already be present in the optional first and second semiconductive composition before introducing to the crosslinking step c) or introduced during the crosslinking step. Peroxide is the preferred crosslinking agent for said optional first and second semiconductive compositions and is preferably included to the pellets of semiconductive composition before the composition is used in the cable production process as described above.

Crosslinking can be carried out at increased temperature which is chosen, as well known, depending on the type of crosslinking agent. For instance temperatures above 150° C., such as from 160 to 350° C., are typical, however without limiting thereto.

The processing temperatures and devices are well known in the art, e.g. conventional mixers and extruders, such as single or twin screw extruders, are suitable for the process of the invention.

The invention further provides a crosslinked power cable, preferably a crosslinked DC power cable, preferably a crosslinked HV or EHV DC power cable, comprising a conductor surrounded by one or more layers, preferably at least by an insulation layer, more preferably at least by an inner semiconductive layer, insulation layer and an outer semiconductive layer, in that order, wherein at least the insulation layer comprises the crosslinked polymer composition of the invention including any of the preferable subgroups or embodiments thereof as defined above or in claims. Optionally and preferably also one or both, preferably both, of the inner semiconductive composition and the optional and preferred outer semiconductive composition are crosslinked.

Naturally, the polymer composition of the invention used in at least one cable layer, preferably in an insulation layer, of the cable of the invention has, when crosslinked, the advantageous electrical properties and preferably any or all the mechanical properties as defined above or in claims.

The invention further provides the use of the Polymer composition, or any of the preferable subgroups or embodiments thereof, as defined above or in claims, in at least one layer, preferably in at least an insulation layer, of a crosslinked power cable, preferably of a crosslinked (DC) power cable, preferably of a crosslinked HV or EHV DC power cable, comprising a conductor surrounded by at least one layer, preferably at least an inner semiconductive layer, insulation layer and an outer semiconductive layer, in that order. The invention provides also the use of the Polymer composition, or any of the preferable subgroups or embodiments thereof, as defined above or in claims, for producing at least one layer, preferably at least an insulation layer, of a crosslinked power cable, preferably of a crosslinked (DC) power cable, preferably of a crosslinked HV or EHV DC power cable, comprising a conductor surrounded by at least one layer, preferably at least an inner semiconductive layer, insulation layer and an outer semiconductive layer, in that order.

The thickness of the insulation layer of the power cable, preferably of the DC cable, more preferably of the HV or EHV DC power cable, is typically 2 mm or more, preferably at least 3 mm, preferably of at least 5 to 100 mm, more preferably from 5 to 50 mm, when measured from a cross section of the insulation layer of the cable.

Determination Methods

Unless otherwise stated in the description or experimental part the following methods were used for the property determinations.

Wt %: % by weight

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylenes and may be determined at different loadings such as 2.16 kg ($MFR_2$) or 21.6 kg ($MFR_{21}$).

Density

The density was measured according to ISO 1183-2. The sample preparation was executed according to ISO 1872-2 Table 3 Q (compression moulding).

Comonomer Contents a) Quantification of Alpha-Olefin Content in Linear Low Density Polyethylenes and Low Density Polyethylenes by NMR Spectroscopy:

The comonomer content was determined by quantitative 13C nuclear magnetic resonance (NMR) spectroscopy after basic assignment (J. Randall JMS—Rev. Macromol. Chem. Phys., C29(2&3), 201-317 (1989)). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140° C. Proton decoupled 13C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125° C., a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

b) Comonomer Content of Polar Comonomers in Low Density Polyethylene (1) Polymers Containing>6 Wt. % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight-% can be converted to mol-% by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 Wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer} - A_{1850}$). Then the maximum absorbance peak for polyethylene peak at 2660 $cm^{-1}$ was subtracted with the absorbance value for the base line at 1850 $cm^{-1}$ ($A_{2660} - A_{1850}$). The ratio between ($A_{comonomer} - A_{1850}$) and ($A_{2660} - A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

PENT (Pennsylvania Notch Test The resistance to slow crack growth was assessed using the Pennsylvania Notch Test (PENT) according to ISO 16241:2005 with some modifications.

A compression moulded plaque of each material was produced according to the following procedure. Granules were heated in a closed mould at 180° C. for 15 minutes without pressure. The heat was turned off and a nominal pressure of 1.7 MPa was applied for 12.5 hours while the sample and mould were left to cool down naturally.

Dimensions of test piece: 60 mm×25 mm×10 mm
Principal notch: 3.5 mm deep
Side notches: 0.7 mm deep
Test temperature of test pieces: 70° C.
Test stress (calculated on the un-notched cross-sectional area): 2.0 MPa
2 test pieces per material
The time to failure was recorded, and the average from 2 test pieces calculated.

DC Conductivity Method

The plaques are compression moulded from pellets of the test polymer composition. The final plaques consist of the test polymer composition and have a thickness of 1 mm and a diameter of 330 mm.

The plaques are press-moulded at 130° C. for 12 min while the pressure is gradually increased from 2 to 20 MPa. Thereafter the temperature is increased and reaches 180° C. after 5 min. The temperature is then kept constant at 180° C. for 15 min during which the plaque becomes fully cross-linked by means of the peroxide present in the test polymer composition. Finally the temperature is decreased using the cooling rate 15° C./min until room temperature is reached when the pressure is released. The plaques are immediately after the pressure release wrapped in metallic foil in order to prevent loss of volatile substances.

A high voltage source is connected to the upper electrode, to apply voltage over the test sample. The resulting current through the sample is measured with an electrometer. The measurement cell is a three electrodes system with brass electrodes. The brass electrodes are equipped with heating pipes connected to a heating circulator, to facilitate measurements at elevated temperature and provide uniform temperature of the test sample. The diameter of the measurement electrode is 100 mm. Silicone rubber skirts are placed between the brass electrode edges and the test sample, to avoid flashovers from the round edges of the electrodes.

The applied voltage was 30 kV DC meaning a mean electric field of 30 kV/mm. The temperature was 70° C. The current through the plaque was logged throughout the whole experiments lasting for 24 hours. The current after 24 hours was used to calculate the conductivity of the insulation.

This method and a schematic picture of the measurement setup for the conductivity measurements has been thoroughly described in a publication presented at the Nordic Insulation Symposium 2009 (Nord-IS 09), Gothenburg, Sweden, Jun. 15-17, 2009, page 55-58: Olsson et al, "Experimental determination of DC conductivity for XLPE insulation".

Method for Determination of the Amount of Double Bonds in the Polymer Composition or in the Polymer A) Quantification of the Amount of Carbon-Carbon Double Bonds by IR Spectroscopy Quantitative infrared (IR) spectroscopy was used to quantify the amount of carbon-carbon doubles (C=C). Calibration was achieved by prior determination of the molar extinction coefficient of the C=C functional groups in representative low molecular weight model compounds of known structure.

The amount of each of these groups (N) was determined as number of carbon-carbon double bonds per thousand total carbon atoms (C=C/1000C) via:

$$N=(A \times 14)/(E \times L \times D)$$

were A is the maximum absorbance defined as peak height, E the molar extinction coefficient of the group in question ($l \cdot mol^{-1} \cdot mm^{-1}$), L the film thickness (mm) and D the density of the material ($g \cdot cm^{-1}$).

The total amount of C=C bonds per thousand total carbon atoms can be calculated through summation of N for the individual C=C containing components.

For polyethylene samples solid-state infrared spectra were recorded using a FTIR spectrometer (Perkin Elmer 2000) on compression moulded thin (0.5-1.0 mm) films at a resolution of 4 $cm^{-1}$ and analysed in absorption mode.

1) Polymer Compositions Comprising Polyethylene Homopolymers and Copolymers, Except Polyethylene Copolymers with >0.4 Wt % Polar Comonomer For polyethylenes three types of C=C containing functional groups were quantified, each with a characteristic absorption and each calibrated to a different model compound resulting in individual extinction coefficients:

vinyl (R—CH=CH2) via 910 $cm^{-1}$ based on 1-decene [dec-1-ene] giving E=13.13 $l \cdot mol^{-1} \cdot mm^{-1}$ vinylidene (RR'C=CH2) via 888 cm$^{-1}$ based on 2-methyl-1-heptene[2-methylhept-1-ene] giving E=18.24 l·mol$^{-1}$·mm$^{-1}$ trans-vinylene (R—CH=CH—R') via 965 cm$^{-1}$ based on trans-4-decene[(E)-dec-4-ene] giving E=15.14 l·mol$^{-1}$·mm$^{-1}$ For polyethylene homopolymers or copolymers with <0.4 wt % of polar comonomer linear baseline correction was applied between approximately 980 and 840 cm$^{-1}$.

2) Polymer Compositions Comprising Polyethylene Copolymers with >0.4 Wt % Polar Comonomer For polyethylene copolymers with >0.4 wt % of polar comonomer two types of C=C containing functional groups were quantified, each with a characteristic absorption and each calibrated to a different model compound resulting in individual extinction coefficients:

vinyl (R—CH=CH2) via 910 cm$^{-1}$ based on 1-decene [dec-1-ene] giving E=13.13 l·mol$^{-1}$·mm$^{-1}$ vinylidene (RR'C=CH2) via 888 cm$^{-1}$ based on 2-methyl-1-heptene[2-methylhept-1-ene] giving E=18.24 l·mol$^{-1}$·mm$^{-1}$

EBA:

For poly(ethylene-co-butylacrylate) (EBA) systems linear baseline correction was applied between approximately 920 and 870 cm$^{-1}$.

EMA:

For poly(ethylene-co-methylacrylate) (EMA) systems linear baseline correction was applied between approximately 930 and 870 cm$^{-1}$.

3) Polymer Compositions Comprising Unsaturated Low Molecular Weight Molecules

For systems containing low molecular weight C=C containing species direct calibration using the molar extinction coefficient of the C=C absorption in the low molecular weight species itself was undertaken.

B) Quantification of Molar Extinction Coefficients by IR Spectroscopy

The molar extinction coefficients were determined according to the procedure given in ASTM D3124-98 and ASTM D6248-98. Solution-state infrared spectra were recorded using a FTIR spectrometer (Perkin Elmer 2000) equipped with a 0.1 mm path length liquid cell at a resolution of 4 cm$^{-1}$.

The molar extinction coefficient (E) was determined as l·mol$^{-1}$·mm via:

$$E = A/(C \times L)$$

were A is the maximum absorbance defined as peak height, C the concentration (mol·l$^{-1}$) and L the cell thickness (mm).

At least three 0.18 mol·l$^{-1}$ solutions in carbondisulphide (CS$_2$) were used and the mean value of the molar extinction coefficient determined.

Experimental Part

Preparation of Polymers of the Examples of the Present Invention and the Reference Example All polymers were low density polyethylenes produced in a high pressure reactor. As to CTA feeds, e.g. the PA content can be given as liter/hour or kg/h and converted to either units using a density of PA of 0.807 kg/liter for the recalculation.

LDPE1:

Ethylene with recycled CTA was compressed in a 5-stage precompressor and a 2-stage hyper compressor with intermediate cooling to reach initial reaction pressure of ca 2628 bar. The total compressor throughput was ca 30 tons/hour. In the compressor area approximately 4.9 liters/hour of propion aldehyde (PA, CAS number: 123-38-6) was added together with approximately 81 kg propylene/hour as chain transfer agents to maintain an MFR of 1.89 g/10 min. Here also 1,7-octadiene was added to the reactor in amount of 27 kg/h. The compressed mixture was heated to 157° C. in a preheating section of a front feed two-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 275° C. after which it was cooled to approximately 200° C. The subsequent 2nd peak reaction temperatures was 264° C. The reaction mixture was depressurised by a kick valve, cooled and polymer was separated from unreacted gas.

TABLE 1

Properties of the polyolefin component LDPE1

| Base Resin Properties | LDPE1 |
| --- | --- |
| MFR 2.16 kg, at 190° C. [g/10 min] | 1.89 |
| Density [kg/m$^3$] | 923 |
| Vinyl [C=C/1000 C] | 0.54 |
| Vinylidene [C=C/1000 C] | 0.16 |
| Trans-vinylene [C=C/1000 C] | 0.06 |

The used additives are commercially available:

Ion exchanger additive (c): synthetic hydrotalcite (IUPAC name: dialuminium hexamagnesium carbonate hexadecahydroxide, CAS no. 11097-59-9), supplied by Kisuma Chemicals under the commercial name DHT-4V Peroxide (PO): DCP=dicumyl peroxide ((CAS no. 80-43-3), commercially available.

Antioxidant (AO): 4,4'-thiobis(2-tertbutyl-5-methylphenol) (CAS no. 96-69-5), commercially available.

Scorch retardant (SR): 2,4-Diphenyl-4-methyl-1-pentene (CAS no. 6362-80-7), commercially available.

The amount of DCP is given in mmol of the content of —O—O— functional group per kg polymer composition. The amounts are also given in brackets as weight-% (wt %).

The components of the inventive polymer composition and the reference composition (no ion exchanger additive (c), crosslinked with the same amount of peroxide as the inventive polymer composition), as well as the DC conductivity results, are given in table 2.

Compounding of the Polymer Compositions:

Polymer pellets were added to a pilot scale extruder (Prism TSE 24TC) together with additives, if not present in the pellets, other than the crosslinking agent and SR. The obtained mixture was meltmixed in conditions given in the below table and extruded to pellets in a conventional manner.

| Set Values Temperatures [° C.] | | | | | | Extruder | | | |
|---|---|---|---|---|---|---|---|---|---|
| Zone 1 | Zone 2 | Zone 3 | Zone 4 | Zone 5 | Zone 6 | rpm | Output [kg/h] | Pressure [bar] | Filter [mesh] |
| 150 | 165 | 180 | 180 | 180 | 180 | 220 | 7 | 58 | 325 |

The crosslinking agent, herein peroxide, and SR, if present, were added in liquid form on to the pellets and the resulting pellets were used for the experimental part.

TABLE 2

The properties of the compositions of the inventive and reference examples:

| | Reference composition | Inventive polymer composition |
|---|---|---|
| LDPE 1* | 100 | 100 |
| Ion exchanger additive (c)**, wt % ppm | | 0.0023 |
| AO**, wt % | 0.08 | 0.08 |
| SR**, wt % | 0.05 | 0.05 |
| PO (mmol —O—O—/kg polymer composition (wt % of final composition**) | 22.8 mmol (0.75 wt %) | 22.8 mmol (0.75 wt %) |
| DC conductivity (fS/m) | 26.0 | 5.7 |

*The wt % amounts of polymer component in table are based on the combined amount of used polymer component(s). The amount 100 wt % of polymer component in table 1 means that the polymer is the sole polymer component present in the test composition.
**The wt % amounts of ion exchanger additive (c), peroxide (wt %), AO and SR are based on the final composition.

Preparation of the cable: The polymer composition of the invention was used to produce an insulation layer of a power cable.

Power Cable Extrusion.

A cable with three layers was made using a commercial semiconductive composition as inner and outer layer. The middle insulation layer was formed of the polymer composition of the invention. The construction of the cable was 50 mm² stranded Al-conductor and 5.5 mm thick insulation. The inner and outer semiconductive layers had a thickness of 1 mm and 1 mm, respectively. The cable line was a catenary Nokia Maillefer 1+2 system, thus one extrusion head for the inner conducting layer and another for the insulation+outer semiconductive layer.

The non-crosslinked cable was cooled in water.

If the cable was crosslinked, then crosslinking was carried out in the vulcanization tube under nitrogen and afterwards cooled in water.

The obtained cable has a low conductivity and shows the applicability of the polymer composition of the invention as a cable layer, preferably as an insulation layer, in power cable, e.g. of a HV DC power cable applications.

We claim:

1. A cable comprising a conductor surrounded by one or more layers, wherein at least one of said layer(s) is an insulation layer which comprises a polymer composition comprising:
    (a) a polyolefin which is an unsaturated LDPE polymer, which is selected from an unsaturated LDPE homopolymer or an unsaturated LDPE copolymer of ethylene with one or more comonomer(s);
    (b) peroxide, and
    (c) an anionic exchanger additive of hydrotalcite type in an amount of 0.0001 to 0.015 wt %, based on the total weight of the polymer composition.

2. The cable according to claim 1, comprising a conductor surrounded by at least an inner semiconductive layer, an insulation layer and an outer semiconductive layer, in that order, wherein at least one layer comprises a polymer composition comprising:
    (a) a polyolefin which is an unsaturated LDPE polymer, which is selected from an unsaturated LDPE homopolymer or an unsaturated LDPE copolymer of ethylene with one or more comonomer(s);
    (b), peroxide, and
    (c) an anionic exchanger additive of hydrotalcite type in an amount of 0.0001 to 0.015 wt %, based on the total weight of the polymer composition.

3. The cable according to previous claim 1, wherein the cable is crosslinked by the peroxide (b).

4. The cable according to claim 1, wherein the cable is a power cable.

5. The cable according to claim 1, wherein the cable is a crosslinkable power cable.

6. The cable according to claim 1, wherein the cable is a crosslinkable direct current (DC) power cable.

7. The cable according to claim 2, wherein the cable is a crosslinkable HV or EHV DC power cable.

8. The cable according to claim 1, wherein the amount of the peroxide is of less than 35 mmol —O—O—/kg polymer composition.

9. The cable according to claim 1, wherein at least one of said layer(s) is an insulation layer.

10. The cable according to claim 1, wherein the at least one said layer(s) consists of the said polymer composition.

11. The cable according to claim 1, wherein the polyolefin is an unsaturated LDPE homopolymer or an unsaturated LDPE copolymer of ethylene with one or more comonomer(s) which contains vinyl groups.

12. The cable according to claim 11, wherein the total amount of vinyl groups present in the unsaturated LDPE is higher than 0.05/1000 carbon atoms when measured according to "Method for determination of the amount of double bonds" described above in the description under "Determination methods".

13. The cable according to claim 1, wherein the polyolefin (a) is an unsaturated LDPE copolymer of ethylene with at least one polyunsaturated comonomer and optionally with one or more other comonomer(s).

14. The cable according to claim 1, wherein the polyolefin (a) contains vinyl groups in total amount of more than 0.20/1000 carbon atoms.

15. The cable according to claim 1, wherein the ion exchanger additive (c) is an inorganic ion exchanger additive.

16. The cable according to claim 1, wherein the ion exchanger additive (c) is an anion exchanger additive of hydrotalcite type.

* * * * *